Patented Oct. 8, 1940

2,216,955

UNITED STATES PATENT OFFICE 2,216,955

OIL BASE DRILLING FLUID AND METHOD OF PREPARING SAME

Thomas V. Moore, Houston, Tex., assignor to Standard Oil Development Company, a corporation of Delaware No Drawing. Application December 24, 1936, Serial No. 117,519

10 Claims. (Cl. 255—1)

In many drilling operations carried on by the rotary method, it is desirable to use a drilling fluid that is substantially free from water and for this purpose oil base drilling fluids have been developed. Such fluids are particularly applicable to drilling operations when an aqueous drilling fluid might disintegrate the rock being penetrated; for example, as in drilling through heaving shale, when the infiltration of water into the porous strata might be detrimental. These fluids are of value in the completion of oil wells with low reservoir pressure, or when it is desired to obtain cores cut without danger of water contamination, as for example, in determining the water content of oil producing sands.

These fluids normally consist of a mineral oil, such as crude oil, mixed with solid materials in order to control the density and viscosity of the drilling fluid. The basis of the improved drilling fluid is an oil, preferably crude oil or an oil such as petroleum oil distillate or residue, or coal tar distillate or residue, or equivalent non-aqueous material that can be obtained in sufficient quantities at low cost. Tar of low viscosity may be used as the base fluid. Other oil bases are crude oil which has been topped, gas oil, lubricating oil, kerosene, naphthenates or the like.

The oil is compounded with a powdered mineral substance that is wet by oil in preference to water. One of the most useful materials that can be mixed with the oil is spent contact clay from oil refineries, which is a fuller's earth or similar material through which mineral oil has been filtered. During the filtration process, the clay or earth particles absorb carbonaceous or tar materials from the oil and acquire the property of being specifically wet by oil in preference to water. The powdered weighting material also can be a carbonaceous coated weighting material such as any substance in the form of a powder, coated with a film of tar or tarry material. The substance may be barytes, finely divided calcium carbonate, oyster shell, silica, sand, iron oxide, clays, or the like. Any of these powders can be carbonized by soaking them in a suitable petroleum oil, vegetable oil or the like and igniting them. Other mineral substances may be used, such as metallic sulfides, such as iron pyrite, lead sulfide, copper sulfide, and sphalerite or chalcocite, oxides of lead, such as red lead or other mineral materials that have the property of being specifically wet to oil without the necessity of being treated with a carbonaceous or tarry material.

I have found that when a drilling fluid is prepared by suspending these materials in oil, the weighting material tends to settle from the suspension, and for this reason, oil base drilling fluids prepared in this manner are not entirely satisfactory.

This invention relates to an improved method of preparing oil base drilling fluids, comprising the suspension of spent contact clay or other powdered material that has a greater tendency to be wetted by oil rather than by water, in an oil, and adding thereto strong sulfuric acid, sulfonic acid, or sulfonates in order to reduce the tendency of the weighting material to settle from the oil.

I have found that sulfuric acid has a marked effect in reducing the tendency of such materials to settle from the oil. From 1 to 6%, by volume, has been found satisfactory for this purpose. As an example of the effectiveness of this reagent, we may cite the following example:

200 cc. of crude oil was mixed with 100 grams of spent contact clay to form a drilling fluid of 8.5 lbs./gallon. After one hour of settling in a 100 cc. graduate, the clay had completely settled from the upper 5 cc. of the oil, and after 24 hours, had completely settled from the upper 30 cc. of oil. By treating the same composition with 4 cc. of concentrated sulfuric acid, a similar test indicated that after 24 hours, the clay had only settled from the upper 5 cc. of the oil. The same composition, when treated with 8 cc. of concentrated sulfuric acid only settled from the upper 3 cc. of the oil at the end of 24 hours. Similar tests, run on a mixture of 200 cc. of the same crude oil with 250 grams of the contact clay gave a drilling mud of a density of 9.9 lbs./gallon that settled from the upper 35 cc. of the oil at the end of 24 hours. The same composition, when treated with 9 cc. of concentrated sulfuric acid settled only from the upper 5 cc. of the oil.

Another mud that had been prepared for drilling purposes was composed of about 250 barrels of Gulf Coast crude oil, 4½ barrels of concentrated sulfuric acid, and approximately 60 tons of spent contact clay. The mud so prepared had a density of about 9.9 lbs./gallon. The stability of the mud prepared in this manner was superior to that of a similar batch of mud prepared without the sulfuric acid. This mud was used to core the producing section of sand in a Gulf Coast field, which comprised about 70 feet of high pressure gas sand, about 130 feet of oil sand, and about 10 feet of water sand. All operations were carried on without difficulty, and with no apparent deterioration of the mud.

I have found that settling of the clay is prevented by using sulfuric acid. I have found also that the settling of the solid material is prevented by using sulfonic acid or sulfonates, but the quantity of such materials required is much greater than the quantity of sulfuric acid required to accomplish the same result. Sulfonic acids suitable for this purpose are produced in considerable quantities by treatment of high viscosity oil with fuming or concentrated sulfuric acid to produce lubricants of superior grades and also in the production of highly refined oils used for medicinal purposes. The sulfuric acid treatment results in the formation of oil soluble and water soluble sulfonates. During this treatment, a certain portion of the sulfonated compounds, principally the sulfo acids, remain in solution in the oil on separation of the acid sludge, and can be extracted from the oil. The oil soluble sulfonates are of particular value in maintaining the powdered mineral substance that is wet by oil in preference to water, such as spent refinery clay in suspension in the oil. The sulfonates may include the metal salts of sulfonic acids.

The so-called sulfated alcohols are also suitable for use in this connection and, for the purpose of describing this invention, are included in the definition of sulfonated material obtained as the reaction products of sulfuric acid and hydrocarbon material. Sulfated alcohols are obtained by reacting sulfuric acid upon unsaturated aliphatic hydrocarbons and the higher molecular weight compounds produced particularly are a suitable addition substance for use in the mud fluid composition herein described.

Treatment with sulfuric acid results in other benefits to the oil base drilling fluid. In one instance, an oil base drilling fluid that had not been treated with sulfuric acid became contaminated with ordinary aqueous drilling fluid and formed an emulsion that was too thick to pump. Treatment with a small quantity of sulfuric acid resulted in thinning of the emulsion and producing a fluid composition which could be pumped. In addition, I have found that treatment with sulfuric acid tends to form a water-in-oil emulsion rather than an oil-in-water emulsion when the material becomes contaminated with water, which is an advantageous property in an oil base drilling fluid.

I have found that the sulfuric acid, sulfonic acid, or sulfonates may be added either to the weighting materials prior to its addition to the oil, to the oil prior to the addition of the weighting material, or to the mixture of weighting material and oil. However, conditions in practice are such that it is generally preferable to add the sulfuric acid, sulfonic acid, or sulfonates after the oil and weighting material have been mixed.

While I do not wish to limit myself in this invention to any theory of its operation, I suggest the following mechanism for the results that I have obtained. I believe that the sulfuric acid, sulfonic acid, or sulfonates react either with the tarry material on the surface of the solid particles to form sulfonates, or with the materials in the oil capable of forming sulfonates, and that the sulfonates or sulfonic acids so formed become adsorbed on the surface of the solid particles and give the results observed. I have observed that the addition of sulfuric acid, sulfonic acid, or sulfonates in this manner in the concentrations that we prefer to use, that is approximately 1 to 6%, does not materially affect the viscosity of the suspension, and this has led me to believe that the sulfuric acid, sulfonic acid, or sulfonates responsible for the stabilization do not act primarily as dispersing agents.

This invention is not to be limited to any example given merely for purposes of illustration, nor to any theory of the reactions, nor to any description of any particular product disclosed herein, but only to the following claims in which I wish to claim all novelty.

I claim:

1. The method of stabilizing an oil base drilling fluid containing oil-wet clay, which comprises adding sulfuric acid to the mixture.

2. The method of preparing an oil base drilling fluid, comprising treating finely divided solid material in such a manner as to render its surface specifically wet to oil, and suspending the material in an oil containing sulfuric acid.

3. The method of preparing an oil base drilling fluid, comprising adding to a mineral oil spent contact clay, used in the refining of petroleum oil, and adding a small amount of sulfuric acid to the mixture whereby the clay is maintained in suspension.

4. An oil base drilling fluid, which comprises an oil in which is suspended a powdered mineral substance that is wet by oil in preference to water, and containing sulfuric acid.

5. An oil base drilling fluid, which comprises an oil in which is suspended a powdered mineral material that is wet by oil in preference to water, and containing reaction products of hydrocarbon materials and sulfuric acid.

6. A drilling fluid, comprising a mineral oil containing a dispersion of spent contact clay impregnated with tarry material, and sulfuric acid.

7. An oil base drilling fluid, comprising a mineral oil containing spent contact clay used in refining of petroleum oil to which has been added a small amount of strong sulfuric acid.

8. An oil base drilling fluid, comprising an oil containing a suspended carbonaceous coated weighting material together with approximately 1 to 6% of strong sulfuric acid.

9. An oil base drilling fluid, comprising an oil containing suspended powdered silica coated with carbonaceous material, and containing sulfuric acid.

10. An oil base drilling fluid in which is suspended clay which contains carbonaceous filter residue plus sulfuric acid.

THOMAS V. MOORE.